(12) United States Patent
Croak et al.

(10) Patent No.: US 8,593,939 B2
(45) Date of Patent: Nov. 26, 2013

(54) METHOD AND APPARATUS FOR MAINTAINING ACTIVE CALLS DURING FAILOVER OF NETWORK ELEMENTS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1323 days.

(21) Appl. No.: 11/109,120

(22) Filed: Apr. 19, 2005

(65) Prior Publication Data

US 2006/0250946 A1  Nov. 9, 2006

(51) Int. Cl.
*G01R 31/08* (2006.01)

(52) U.S. Cl.
USPC .................................................. 370/216

(58) Field of Classification Search
USPC ......... 379/221.01, 221.03, 221.04, 112.02, 9; 370/216–228, 351–356; 714/114
See application file for complete search history.

(56) References Cited

U.S. PATENT DOCUMENTS

| | | | | |
|---|---|---|---|---|
| 5,754,526 A * | 5/1998 | Kaneko et al. | ................ | 370/217 |
| 6,088,328 A * | 7/2000 | McKnight | ..................... | 370/216 |
| 6,522,732 B1 * | 2/2003 | Pullen et al. | ............. | 379/112.02 |
| 6,590,961 B1 * | 7/2003 | Gulli et al. | ........................ | 379/9 |
| 6,674,713 B1 * | 1/2004 | Berg et al. | ...................... | 370/217 |
| 6,751,188 B1 * | 6/2004 | Medved et al. | ............... | 370/216 |
| 6,785,223 B1 * | 8/2004 | Korpi et al. | .................... | 370/218 |
| 6,785,840 B1 * | 8/2004 | Smith et al. | ..................... | 714/11 |
| 7,007,190 B1 * | 2/2006 | Kurapati et al. | .................. | 714/4 |
| 7,257,629 B2 * | 8/2007 | Manzardo | ..................... | 709/224 |
| 7,539,127 B1 * | 5/2009 | Shaffer et al. | ................. | 370/216 |
| 2003/0061319 A1 * | 3/2003 | Manzardo | ..................... | 709/221 |
| 2004/0117687 A1 * | 6/2004 | Smith | ............................. | 714/13 |
| 2006/0092831 A1 * | 5/2006 | Hartnett et al. | ............... | 370/217 |
| 2007/0160031 A1 * | 7/2007 | Sylvain | ........................ | 370/352 |
| 2007/0165516 A1 * | 7/2007 | Xu et al. | ........................ | 370/217 |
| 2007/0237175 A1 * | 10/2007 | Benedyk et al. | .............. | 370/467 |

OTHER PUBLICATIONS

Office Action for CA 2,544,159, Jan. 7, 2010, copy consists of 8 pages.

* cited by examiner

*Primary Examiner* — Duc Nguyen
*Assistant Examiner* — Sonia Gay

(57) ABSTRACT

A method and apparatus for keeping transitory state in a packet network so that in the event of a failover of a network element, existing active calls can be quickly re-established by the packet network or briefly held in a suspended state until the affected network element returns to a healthy state is disclosed.

18 Claims, 5 Drawing Sheets

METHOD AND APPARATUS FOR MAINTAINING ACTIVE CALLS DURING FAILOVER OF NETWORK ELEMENTS

The present invention relates generally to communication networks and, more particularly, to a method and apparatus for maintaining active calls during failover of network elements in packet networks, e.g. Voice over Internet Protocol (VoIP) networks.

BACKGROUND OF THE INVENTION

Users of telephony services occasionally experience disruptions to their conversations due to network events such as failovers and other transitory service failures where calls in progress are dropped. These failovers can be due to regular maintenance of network elements or caused by unrecoverable failures in network elements. These events although rare can cause a great deal of frustration to residential users and can seriously impact business users who may lose valuable sales as a result of cut off calls. After such an event, users are forced to hang up, and reconnect to the terminating endpoint thereby costing them both time and money.

Therefore, a need exists for a method and apparatus for maintaining active calls during failover of network elements in a packet network, e.g., a VoIP network.

SUMMARY OF THE INVENTION

In one embodiment, the present invention enables a method for keeping transitory state in a packet network, e.g., a VoIP network. By maintaining the transitory state, if a failover of a network element occurs, existing active calls can be quickly re-established by the packet network or briefly held in a suspended state until the affected network element returns to a healthy state.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
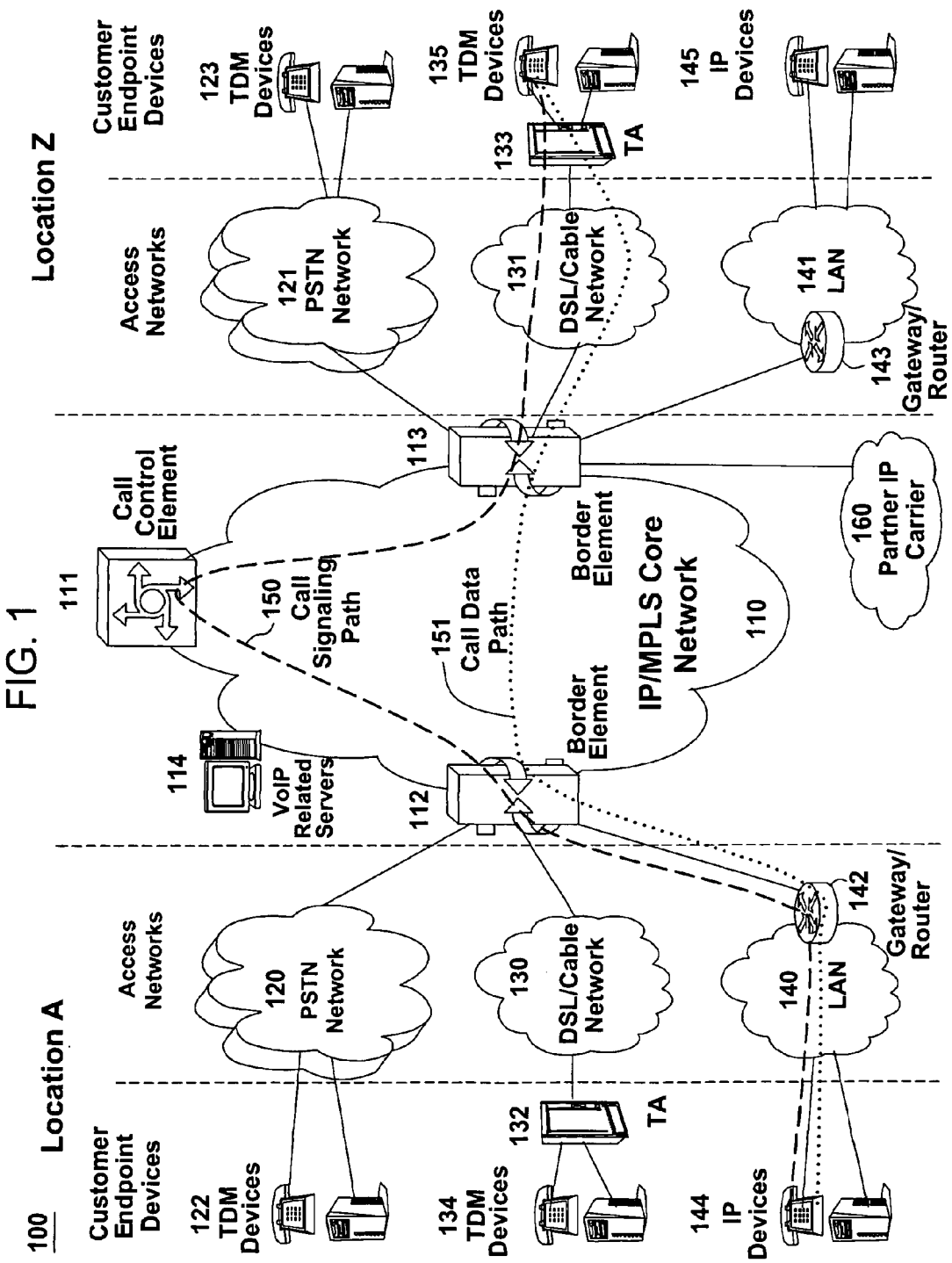
FIG. 1 illustrates an exemplary Voice over Internet Protocol (VoIP) network related to the present invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Users of telephony services occasionally experience disruptions to their conversations due to network events such as failovers and other transitory service failures where calls in progress are dropped. These failovers can be due to regular maintenance of network elements or caused by unrecoverable failures in network elements. These events although rare can cause a great deal of frustration to residential users and can seriously impact business users who may lose valuable sales as a result of cut off calls. After such an event, users are forced to hang up, and reconnect to the terminating endpoint, thereby costing them both time and money.

To address this criticality, the present invention enables a method for keeping transitory state in the packet network so that in the event of a failover of a network element, existing active calls can be quickly re-established by the network or briefly held in a suspended state until the affected network element returns to a healthy state.

Figure 2:
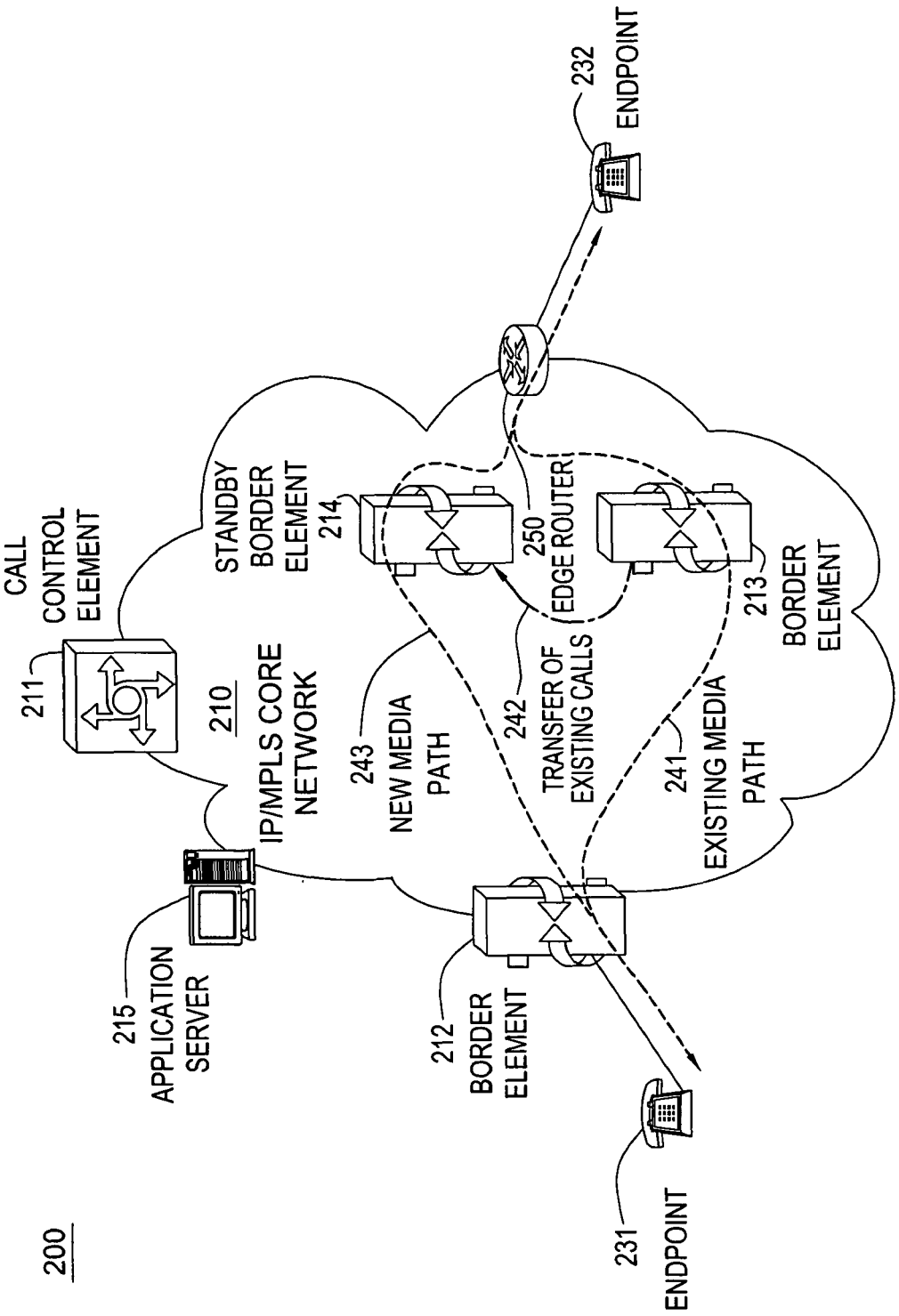
FIG. 2 illustrates an example of maintaining active calls during failover of network elements in a VoIP network of the present invention.

FIG. 2 illustrates an example of maintaining active calls during failover of network elements in a packet network, e.g., a VoIP network. In FIG. 2, endpoint 231 and endpoint 232 are engaged in an ongoing call conversation using media path 241 traversing thru BE 212 and BE 213. In one embodiment of the present invention, when a failover of a component within BE 213 occurs, whether it is due to network maintenance or network equipment component failure, BE 213 will keep the existing call in a suspended state when it is performing failover operations within the system until it is returned to a healthy state. While the failover operation is being performed, BE 213 keeps all the active call states within the system to ensure active calls are not lost during the failover attempt.

In another embodiment of the present invention, when a failover from BE 213 to standby BE 214 occurs, whether it is due to network maintenance or network equipment component failure, BE 213 will keep the existing call in a suspended state and then transfer all the active call states currently running in BE 213 to standby BE 214 using flow 242. After the active call states have been transferred to BE 214, BE 214 will switch from the standby mode to the active mode and take over all active calls that have been placed in suspended state originally supported by BE 213. The media path 241 will be switched to media path 243 when BE 214 becomes active to take over calls originally supported by BE 213.

Note that the described failover scenarios are applicable to, but are not limited to, other network element types as well, such as Media Server (MS), CCE, or even Application Server (AS). A CCE is a network element that performs call control functions to setup a call, an AS is a network element that comprises the data as well as applications that the CCE needs in order to setup a call, and a Media Server (MS) is a special server that typically handles and terminates media streams, and to provide services such as announcements, bridges, transcoding, and Interactive Voice Response (IVR) messages.

Figure 3:
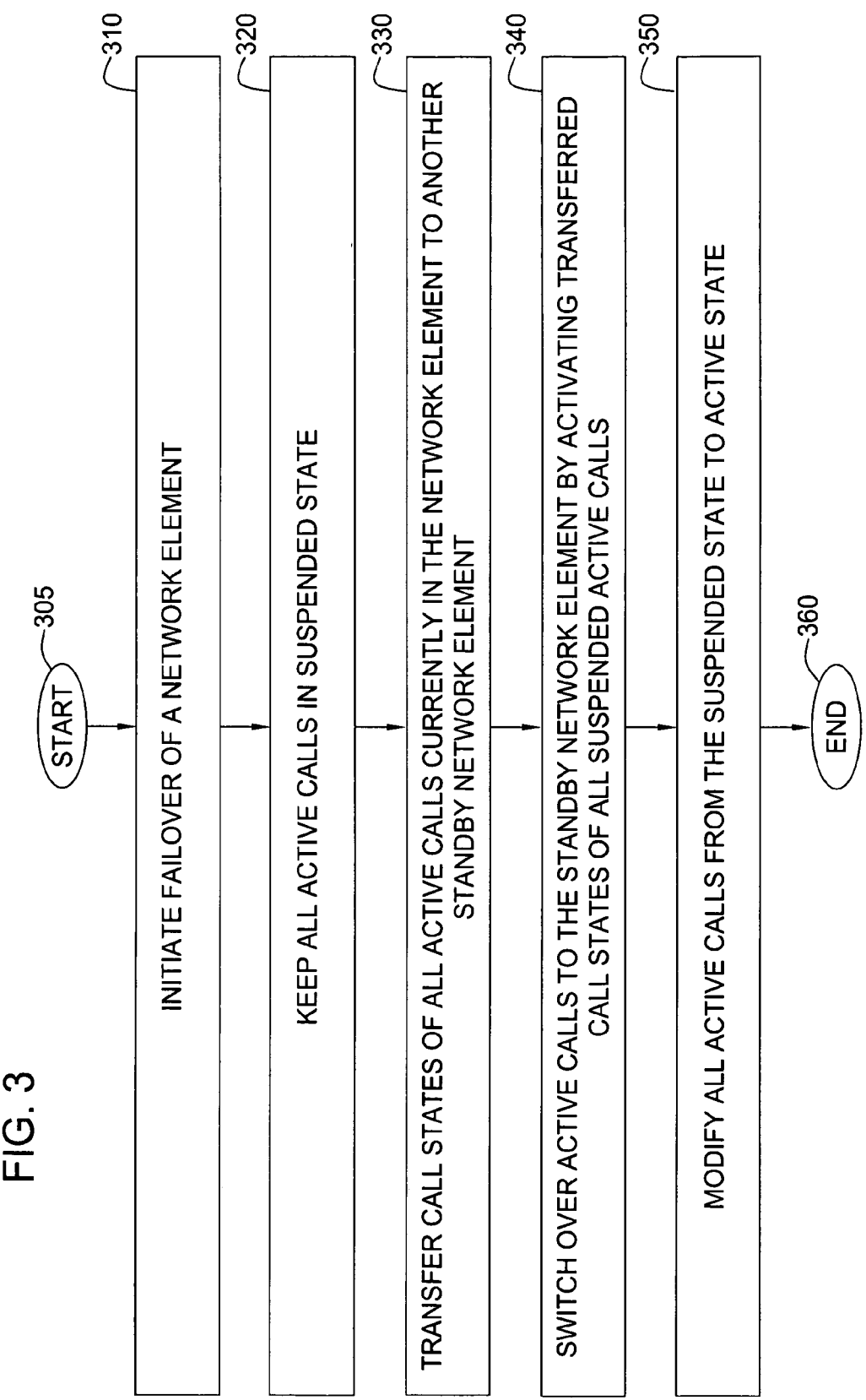
FIG. 3 illustrates a flowchart of a method for maintaining active calls during failover of one network element to another network element in a VoIP network of the present invention.

FIG. 3 illustrates a flowchart of a method 300 for maintaining active calls during failover of one network element to another network element in a packet network, e.g., a VoIP network. Method 300 starts in step 305 and proceeds to step 310.

In step 310, the method 300 initiates a failover of an active network element to a standby network element. The failover can be triggered by either a maintenance event or a network element failure event. In step 320, the method keeps all active calls in suspended state within the active system. In step 330, the method transfers call states of all active calls currently in suspended state in the active network element to a standby network element. In step 340, the method switches over active calls to the standby network element by activating the transferred call states of all suspended active calls in the standby network element. The standby network element is now in an active mode and no longer in the standby mode. In step 350, the method changes all active calls that have been placed in suspended state to active state again. The method ends in step 360.

Figure 4:
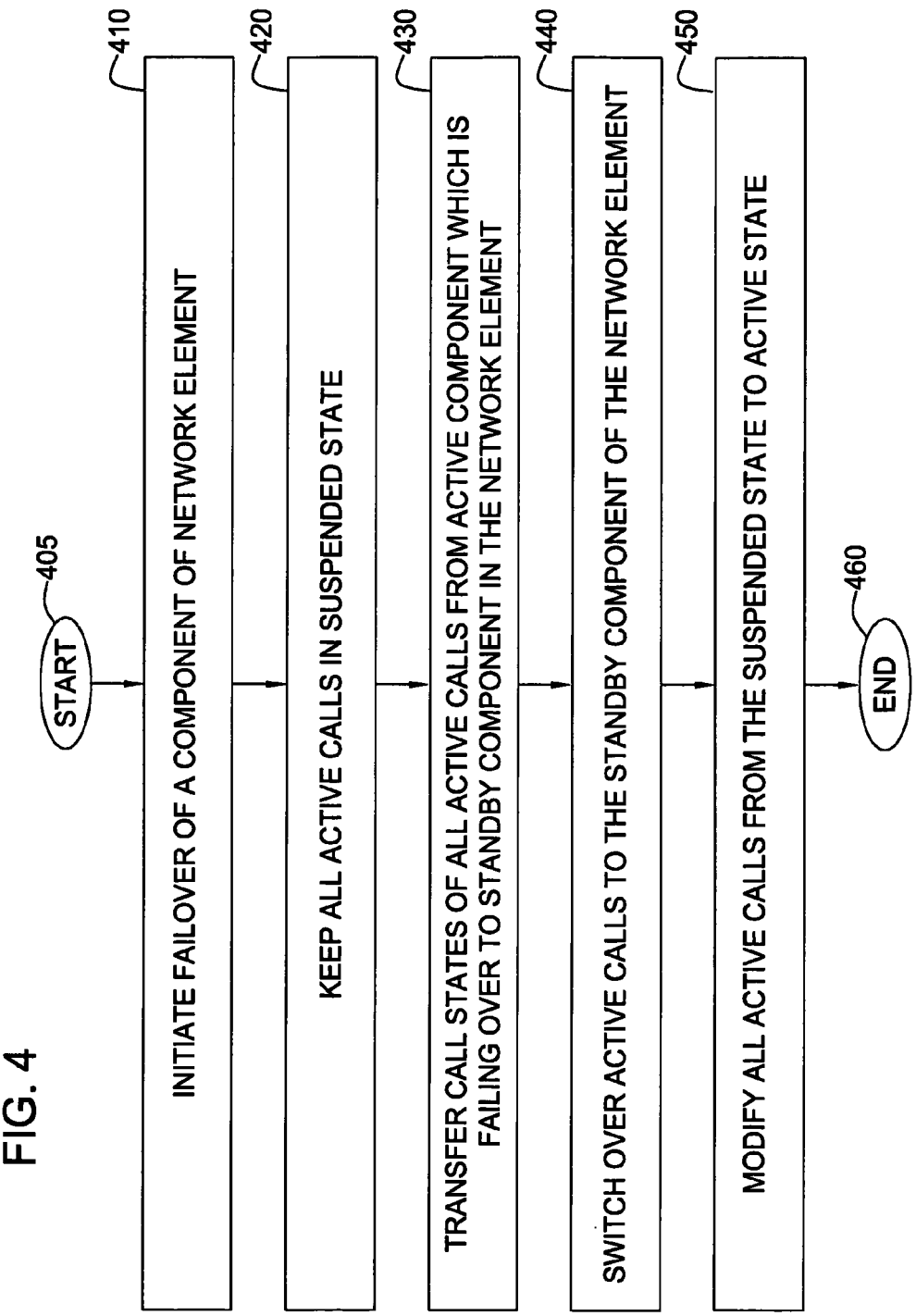
FIG. 4 illustrates a flowchart of a method for maintaining active calls during failover of a component within a network element in a VoIP network of the present invention.

FIG. 4 illustrates a flowchart of a method 400 for maintaining active calls during failover of a component within a network element in a packet network, e.g., a VoIP network. Method 400 starts in step 405 and proceeds to step 410.

In step 410, the method 400 initiates a failover of an active component to a standby component within a network element. The failover can be triggered by either a maintenance event or a network element failure event. In step 420, the method keeps all active calls in suspended state within the network element. In step 430, the method transfer call states of all active calls currently in the active component, which is failing over, to the standby component within the network element. In step 440, the method switches over active calls to the standby component within the network element. The standby component within the network element is now in an active mode and no longer in the standby mode. In step 450, the method changes all active calls that have been placed in suspended state to active state again. The method ends in step 460.

It should be noted that if the failover operations fail to complete within a pre-specified period of time, all active calls will be dropped and need to be redialed.

Figure 5:
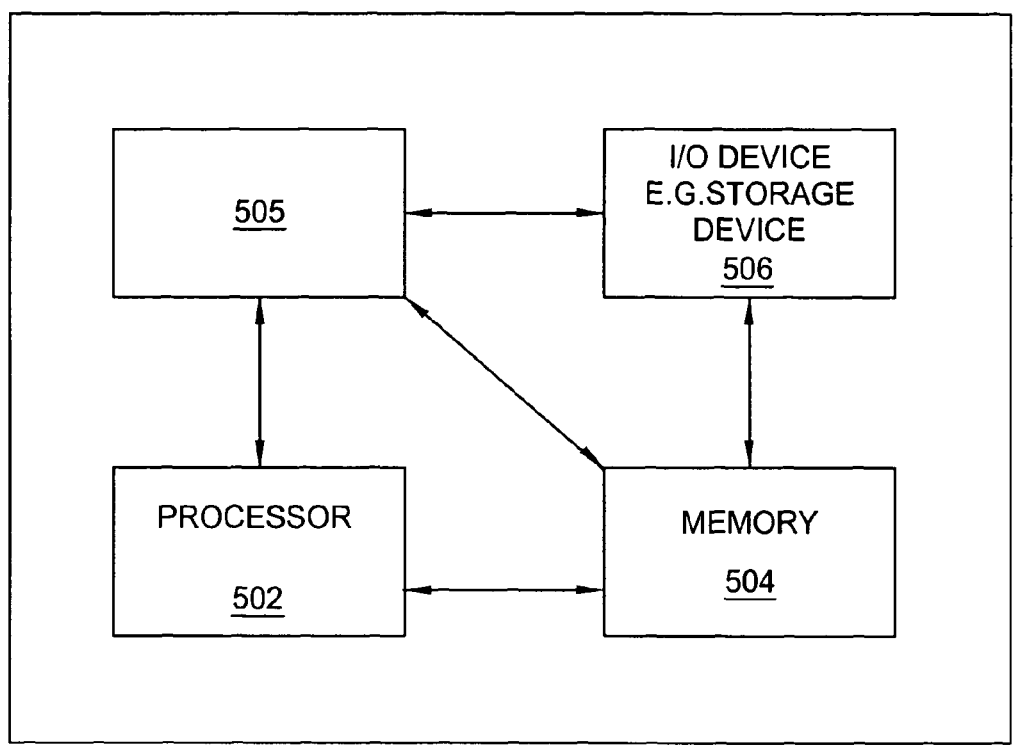
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), an active calls maintenance module 505, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present active calls maintenance module or process 505 can be loaded into memory 504 and executed by processor 502 to implement the functions as discussed above. As such, the present active calls maintenance process 505 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for maintaining active calls during a failover in a communication network, comprising:
suspending, by a processor of an active network element, all of the active calls between a plurality of calling endpoints and a plurality of called endpoints in the active network element where the active calls are placed in a suspended active state;
transferring, by the processor of the active network element, call states of the active calls in the suspended active state in the active network element to a standby network element when the failover relates to the active network element; and
switching over, by the processor of the active network element, the active calls in the suspended active state to the standby network element by activating the transferred call states of the active calls in the suspended active state where the active calls are supported by the standby network element between the plurality of calling endpoints and the plurality of called endpoints, wherein the active network element comprises an active border element and the standby network element comprises a standby border element, wherein if the transferring and the switching fail to complete within a pre-specified period of time, the active calls are dropped.

2. The method of claim 1, wherein the communication network is an internet protocol network.

3. The method of claim 1, wherein the transferring comprises:
keeping the active calls in the suspended active state.

4. The method of claim 1, wherein the transferring the call states is initiated by an active network element failure event.

5. The method of claim 1, wherein the activating comprises:
modifying the active calls from the suspended active states to active states.

6. The method of claim 1, wherein the switching over the active calls to the standby network element comprises:
modifying a current media path of the active calls to a new media path to pass through the standby network element.

7. A non-transitory computer readable medium a plurality of instructions which, when executed by a processor of an active network element, cause the processor to perform operations for maintaining active calls during a failover in a communication network, the operations comprising:
suspending all of the active calls between a plurality of calling endpoints and a plurality of called endpoints in the active network element so that where the active calls are placed in a suspended active state;
transferring call states of the active calls in the suspended active state in the active network element to a standby network element when the failover relates to the active network element; and
switching over the active calls in the suspended active state to the standby network element by activating the transferred call states of the active calls in the suspended active state where the active calls are supported by the standby network element between the plurality of calling endpoints and the plurality of called endpoints, wherein the active network element comprises an active border element and the standby network element comprises a standby border element, wherein if the transferring and the switching fail to complete within a pre-specified period of time, the active calls are dropped.

8. The non-transitory computer readable medium of claim 7, wherein the communication network is an Internet protocol network.

9. The non-transitory computer readable medium of claim 7, wherein the transferring comprises:
keeping the active calls in the suspended active state.

10. The non-transitory computer readable medium of claim 7, wherein the transferring the call states is initiated by an active network element failure event.

11. The non-transitory computer readable medium of claim 7, wherein the activating comprises:
modifying the active calls from the suspended active states to active states.

12. The non-transitory computer readable medium of claim 7, wherein the switching over the active calls to the standby network element comprises:
modifying a current media path of the active calls to a new media path to pass through the standby network element.

13. An apparatus for maintaining active calls during a failover in a communication network, comprising:
a processor of an active network element; and
a non-transitory computer readable medium storing a plurality of instructions which, when executed by the processor, cause the processor to perform operations, the operations comprising:
suspending all of the active calls between a plurality of calling endpoints and a plurality of called endpoints in the active network element where the active calls are placed in a suspended active state;

transferring call states of the active calls in the suspended active state in the active network element to a standby network element when the failover relates to the active network element; and switching over the active calls in the suspended active state to the standby network element by activating the transferred call states of the active calls in the suspended active state where the active calls are supported by the standby network element between the plurality of calling endpoints and the plurality of called endpoints, wherein the active network element comprises an active border element and the standby network element comprises a standby border element, wherein if the transferring and the switching fail to complete within a pre-specified period of time, the active calls are dropped.

14. The apparatus of claim 13, wherein the communication network is an internet protocol network.

15. The apparatus of claim 13, wherein the transferring keeps the active calls in the suspended active state.

16. The apparatus of claim 13, wherein the transferring the call states is initiated by an active network element failure event.

17. The apparatus of claim 13, wherein the activating comprises:
 modifying the active calls from the suspended active states to active states.

18. The apparatus of claim 13, wherein the switching modifies a current media path of the active calls to a new media path to pass through the standby network element.

\* \* \* \* \*